April 14, 1964  G. ALFIERI  3,128,490
ARTICULATED PARALLELOGRAM SUPPORTING DEVICE FOR SUPPORTING
BLADES OR SIMILAR PARTS IN AUTOMOTIVE VEHICLE WIPERS
Filed Dec. 28, 1962  2 Sheets-Sheet 1

Giuseppe Alfieri
INVENTOR.

BY Wenderoth, Lind
and Ponack, Attorneys

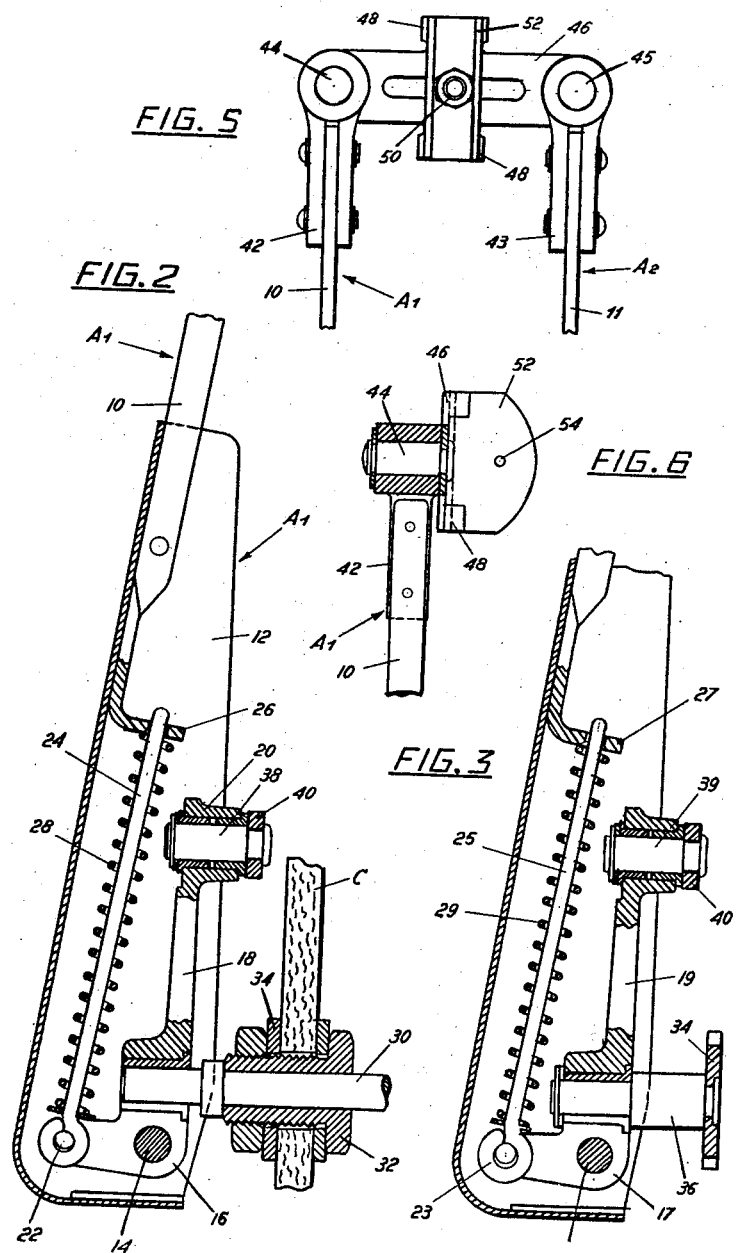

United States Patent Office 3,128,490
Patented Apr. 14, 1964

3,128,490
ARTICULATED PARALLELOGRAM SUPPORTING DEVICE FOR SUPPORTING BLADES OR SIMILAR PARTS IN AUTOMOTIVE VEHICLE WIPERS
Giuseppe Alfieri, Milan, Italy, assignor to Fabbrica Italiana Magneti Marelli S.p.A., Milan, Italy, a corporation of Italy
Filed Dec. 28, 1962, Ser. No. 248,119
Claims priority, application Italy Jan. 2, 1962
2 Claims. (Cl. 15—250.23)

This invention relates to a device or system for supporting the blades or equivalent parts applied in windshield or windscreen wipers, in such a manner that the aforesaid blades' position will remain constant during the oscillatory sweep of the wiper.

To have a maximum wiping effect on the windshields of vehicles, the wiper blades must keep a constant orientation in their oscillatory sweep over the windshield glass surface, and take on successive parallel positions during their turn.

Various existing devices of the articulated parallelogram type or other straight line motion devices can provide a similar result. However, such devices have a number of drawbacks as a result of which some of the desired practical and operational reqiurements cannot be properly fulfilled.

This invention concerns several improvements in the specified devices, aimed at improving the overall operation of the windshield wiper, and at simplifying its installation on the vehicle.

The device according to this invention has two arms connected to each other by articulated joints and relevant cross beam, forming altogether an articulated parallelogram for the blades or equivalent parts, and characterized in that the cross beam linking the two arms in their upper portion secures the said blades or equivalent parts, while the lower portions of the arms are pivoted by suitably spring toggle members to two cranks, one of which is in turn attached to the wiper actuating shaft, while the other is pivoted to the shaft support, said cranks being connected to each other in their upper section by a connecting rod so as to form a second articulated parallelogram which permits moving the beades away from the glass surface when the arms are in their lowered position.

The arms are conveniently arranged so that at least one of their sections is flexible, to absorb and compensate for the forces of the masses in play, which are animated by the alternating oscillatory motion of the wiper.

The cross beam linking the upper portions of the arms is fabricated of synthetic cast material, and has, in its mid longitudinal portion some members to secure a blade or equivalent part, so as to reduce its mass without however altering its resistance.

The description which follows, illustrates one of the embodiments of the invention, taken in conjunction with the attached drawings, in which:

FIGURES 2 and 3 are two vertical cross sectional views of the two wiper arm elements.

FIGURE 5 is a rear view of the upper end of the wiper arm, while

FIGURE 6 is a cross sectional detail of FIGURE 5.

As illustrated in the drawings the wiper arm consists of identical elements (such as the two arms A1 and A2 shown); in the description which follows, the parts identified with even and odd numbers pertain to duplicate identical parts.

Figure 1:
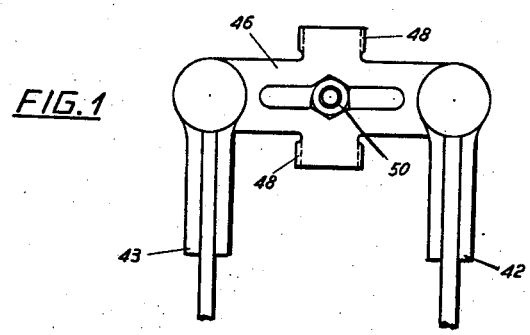
FIG. 1 is a front view of the wiper arm in accordance with the invention.
Figure 4:
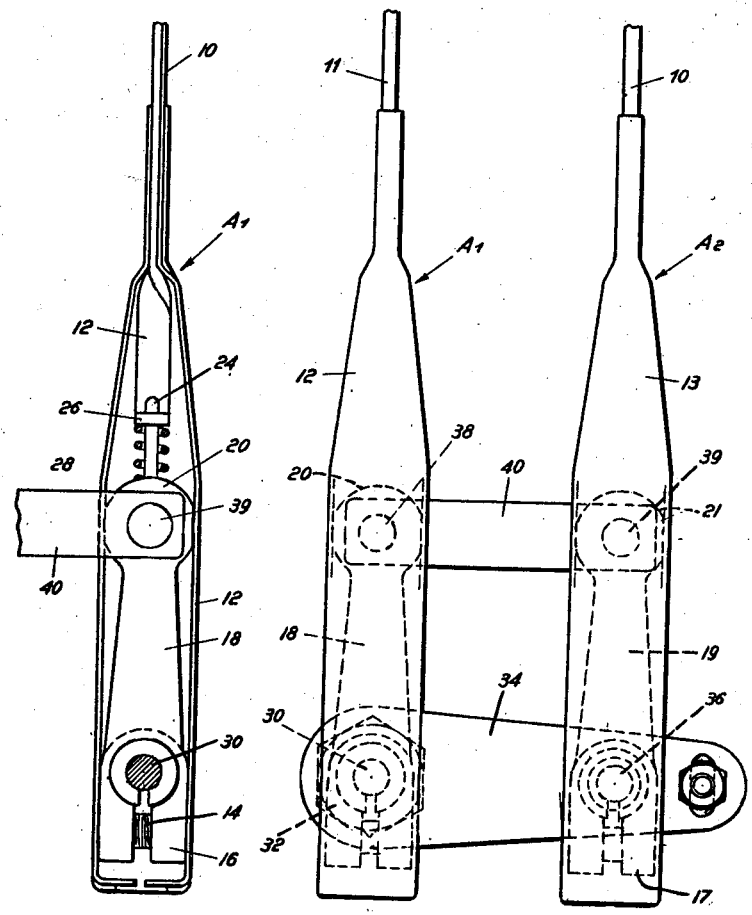
FIGURE 4 is a rear view of one of the wiper arm elements.

Arm A1 of the wiper arm shown in the figures, has a flexible section 10 (in arm A2 said identical section is identified with number 11), the lower end of which is secured to the side of a box shaped support 12, which is hinged by a threaded pivot 14 to a clamp 16 in the lower end of a counter beam 18, the upper end of which has a drilled head portion 20. Said counter beam 18, along with counter beam 19 forms suitable cranks for the purposes to be described here below, each of said cranks being lodged in its relevant base shaped support 12 and 13, respectively.

A pin 22 hinges the end or eyelet of a rod 24 to clamp 16, the other end of said rod 24 being movably mounted in the hole of a lug 26 formed by the bend in the end of arm 10.

A coil spring 28 is threaded on rod 24, and exerts a clockwise thrust on arm 10 thereby keeping against the glass surface C the wiper blade, which will be described here below.

The end of actuating motor shaft 30 is connected to either one of the cranks 18 or 19 (to crank 18 in the case illustrated) by means of a threaded pivot 14 (the motor is not shown in the figure). Said motor shaft is supported in a suitable sleeve or bush 32, secured to the windshield glass C, or to some part adjacent thereto. The sleeve or bush also holds a connecting link 34, the other end of which has a pivot 36 for crank 19 of arm A2.

The head portions 20 and 21 of cranks 18 and 19 have suitable pivots 38 and 39, to receive an articulated connecting link 40 and forming, with the latter, the cranks and connecting link 34 and articulated parallelogram.

The upper ends of arms 10 and 11 are lodged in hollow supporting pieces 42 and 43, the ends of which have suitable eyelets for pivots 44 and 45, and which are movably connected to a cross beam 46, the length of the latter being identical to that of link 40, thereby forming, along with arms 10 and 11 and the connecting link 34 above described, a second articulated parallelogram.

The middle portion of cross beam 46 has a pair of tabs 48, holding, through locking screw 50, a U bolt 52, to which the arm (not shown) is pivoted in the usual known manner by means of a pivot 54.

Cross beam 46, and eventually, the other parts, are fabricated of die cast resins, preferably polyamides. On the other hand, as previously explained, arms 10 and 11 are fabricated of materials suitable to provide a certain degree of flexiblity, particularly in the direction of their oscillating sweep motion, thereby to dampen and reduce the inertial forces generated with each reversal of their motion.

In the embodiment illustrated arms 10 and 11 are made of bars having a rectangular cross section, arranged in such a manner that their major centerline is parallel to the driving shaft 30.

The assembly described, consisting of arms 10 and 11 and cross beam 46 with its relevant wiper can be conveniently turned away from the glass surface of the windshield, since said arms 10 and 11 are rotatably mounted in their respective pivots 14 and 15. During rotation of the arms, coil springs 28 and 29 are at first compressed for a distance, and then relaxed again, thereby exerting on said arms an action which holds them in the lowered position.

Having thus described the invention, it will be apparent to those of ordinary skill in the art to which the invention pertains, that various modifications and changes may be made in the illustrated embodiments without departing from either the spirit or the scope of the invention: Therefore, what is claimed as new and desired to be secured by Letters Patent is:

1. A device for supporting the blade of windshield wipers comprising two pivotally mounted arms, a cross bar pivotally connected to said arms at one end thereof, means for holding a blade on said cross bar, a crank associated with each arm at the other end thereof, resilient toggle means interconnecting said arms with said cranks so that said arms may be swung away from a windshield, a shaft for oscillating said device fixed to one of said cranks, a second cross bar pivotally connecting said cranks at one end thereof so that said cranks are oscillated in unison by said shaft and a third cross bar pivotally connecting said cranks at the level of said shaft so that a pair of articulated parallelograms are formed comprising said arms and said first and third cross bars and said cranks and said second and third cross bars, said resilient toggle means comprising a pivotally mounted extension upon each of said cranks, a pivot pin upon said extension, a rod pivotally mounted upon said pin and a coil spring mounted upon said rod coacting with its corresponding arm.

2. A device as set forth in claim 1 wherein each of said arms is located in a housing pivotally connected to said extension.

References Cited in the file of this patent

UNITED STATES PATENTS

| | | |
|---|---|---|
| 2,286,449 | Wahlberg | June 16, 1942 |
| 2,915,772 | Ziegler | Dec. 8, 1959 |

FOREIGN PATENTS

| | | |
|---|---|---|
| 1,078,461 | Germany | Mar. 24, 1960 |